United States Patent [19]

Chikuma et al.

[11] Patent Number: 4,942,471
[45] Date of Patent: Jul. 17, 1990

[54] BLANKING CIRCUIT FOR TELEVISION RECEIVER

[75] Inventors: Takashi Chikuma, Kanagawa; Ichiro Tsutsui, Tokyo, both of Japan

[73] Assignee: Sony Corporation, Tokyo, Japan

[21] Appl. No.: 385,452

[22] Filed: Jul. 27, 1989

[30] Foreign Application Priority Data

Aug. 10, 1988 [JP] Japan ................................. 63-198094

[51] Int. Cl.⁵ .............................................. H04N 3/24
[52] U.S. Cl. .................................... 358/165; 358/180; 315/384
[58] Field of Search ............... 358/148, 165, 180, 159; 315/384

[56] References Cited

U.S. PATENT DOCUMENTS

| 4,547,708 | 10/1985 | Haferl | 358/180 |
| 4,556,906 | 12/1985 | Dischert et al. | 358/180 |
| 4,612,484 | 9/1986 | Westwood et al. | 358/165 |
| 4,652,920 | 3/1987 | Dietz | 358/165 |

FOREIGN PATENT DOCUMENTS 158271 7/1986 Japan .

Primary Examiner—John W. Shepperd
Assistant Examiner—Michael D. Parker
Attorney, Agent, or Firm—Lewis H. Eslinger; Jay H. Maioli

[57] ABSTRACT

A blanking circuit for use in a television receiver designed for video signals of both the HDTV and double-speed scanning NTSC systems comprises a sawtooth generator, a reference voltage generator, a comparator for comparing the sawtooth signal with the reference voltage, a switch for selectively changing the relative level of the reference voltage and the sawtooth signal in conformity with the input broadcasting system, and with the output of the comparator supplied as a blanking pulse to a video signal processor. Due to selective change of the time constant of the sawtooth generator or the change of the threshold level of the reference voltage, a proper blanking pulse can be produced with high precision to prevent losing the image on the monitor CRT screen, and an adequate blanking interval is exactly obtained.

12 Claims, 4 Drawing Sheets

BLANKING CIRCUIT FOR TELEVISION RECEIVER

BACKGROUND OF THE INVENTION

1. Field of the Invention

The present invention relates generally to the generation of blanking pulses in a cathode-ray tube and, more particularly, to a blanking pulse generating circuit adapted for use in a television receiver where the horizontal scanning frequency is selectively changeable.

2. Description of the Background

In a television receiver, the coil for deflecting the electron beam in the cathode ray tube (CRT) is supplied with a sawtooth signal whose waveform inclination or slope varies in a tracing interval and a flyback interval, and in which the electron beam is interrupted during each flyback interval to improve the image quality.

It has been customary that a blanking pulse applied to interrupt the electron beam during the flyback interval is formed by slicing. An example of a so-called slicing circuit is shown in FIG. 5, in which a flyback pulse $P_b$ is output from a horizontal flyback transformer FT that is coupled to a horizontal output transistor Q and a damper diode D, which form a deflection circuit for supplying a sawtooth waveform signal to a deflection coil DY adjacent the CRT (not shown). Nevertheless, because it is impossible in this case to execute blanking by a predetermined amount in advance of a synchronizing signal, there occasionally appears a folded incomplete image at the right-hand side of the CRT screen, particularly in a television receiver where overscan is not performed. Consequently, a complicated waveform processing circuit is typically required in order to obtain the proper blanking pulse.

Furthermore, there is another problem such that if the blanking interval is prolonged by a waveform shaping circuit, the left-hand side of the image is rendered defective on the CRT screen of the monitor.

More particularly, in a television receiver that is designed for monitoring video signals of different horizontal scanning frequencies, such as in the case of a receiver intended for receiving both high definition television (HDTV) broadcasts and ordinary television broadcasts, the relative phase and duration of the blanking signal are changed upon the input of video signals of such different television systems, which consequently results in deteriorating the quality of the monitor image. Meanwhile, the monitor receiver is usually used in most broadcasting stations for displaying and watching a synchronized image portion at the center of the CRT screen. Thus, some difficulties are presented in order to attain a proper blanking interval in such operation.

OBJECTS AND SUMMARY OF THE INVENTION

Accordingly, it is an object of the present invention to provide apparatus for generating blanking pulses that can eliminate the defects inherent in such circuits known heretofore.

Another object of this invention resides in providing an improved video blanking circuit for use in a television receiver.

According to an aspect of this invention, a sawtooth generator is reset periodically at a horizontal scanning frequency, and a blanking pulse generator sets a blanking interval by comparing the output of the sawtooth generator with a reference voltage. The level of such reference voltage, or the time constant of the sawtooth generator, is selectively switched in correspondence to the horizontal scanning frequency, so that proper blanking pulses can always be supplied despite a substantial change in the horizontal scanning frequency.

More specifically, the blanking circuit of the present invention comprises a sawtooth generator reset by a synchronizing signal included in a monitor video signal, a comparator for comparing the output signal of the sawtooth generator with a reference voltage, and a switching circuit for selectively changing either the time constant of the sawtooth generator or the threshold level of the reference voltage in response to the horizontal scanning frequency of the input video signal to be displayed on the monitor.

When any monitor video signal of a different horizontal scanning frequency is selected, the switching circuit functions selectively to change the time constant of the sawtooth generator or the threshold level of the reference voltage, whereby a blanking pulse can be generated with high precision to execute proper blanking in a predetermined range from a point in time anterior to the horizontal synchronizing signal, thereby preventing partial loss of the monitor image on the CRT screen while enabling the exact setting of an adequate blanking interval.

The above and other objects, features, and advantages of the present invention will become apparent from the following detailed description of illustrative embodiments thereof to be read in conjunction with the accompanying drawings.

DETAILS DESCRIPTION OF PREFERRED EMBODIMENTS

Figure 1:
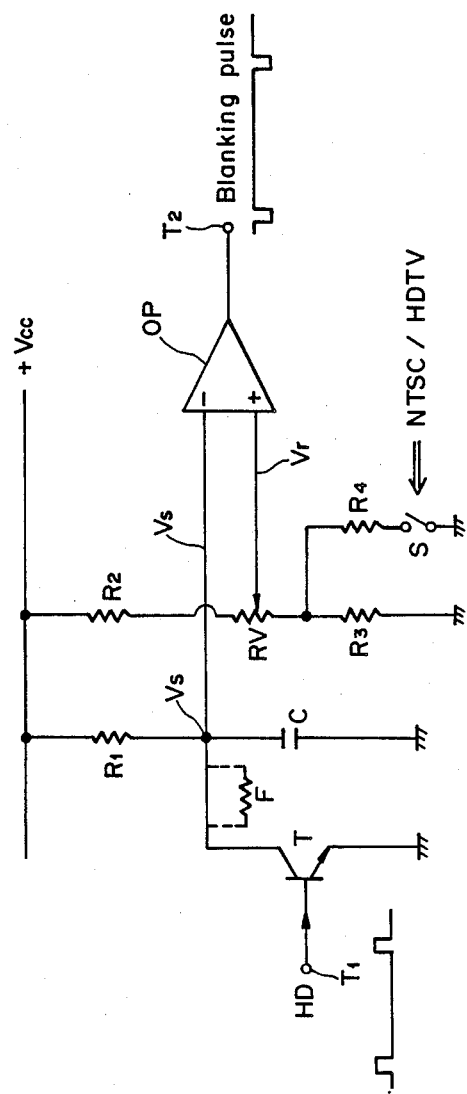
FIG. 1 is a circuit diagram of a blanking circuit according to an embodiment of the present invention.

In the embodiment of FIG. 1, the blanking circuit has an input terminal T1 to receive a horizontal synchronizing signal or a flyback pulse signal and a blanking pulse output terminal T2. A resistor R1 and a capacitor C produce a sawtooth signal. The current flowing through the resistor R1 is stored to charge the capacitor C, and the voltage across it serves as a ramp signal that is reset or discharged periodically by a transistor T. Transistor T is controlled to be turned on by a horizontal synchronizing signal HD, so that the desired sawtooth signal is obtained.

Fixed resistors R2, R3, R4 and a variable resistor RV form a voltage divider that produces a reference voltage Vr for an operational amplifier OP, which functions as a comparator. This voltage divider is so formed that the reference voltage can be selectively changed by a switch S from a level Vr1 to some other level Vr2 by inserting the resistor R4 in parallel with the resistor R3.

This embodiment is so constructed that the switch S is turned on or closed when monitoring a video signal of high definition television (HDTV) system, which adopts 1125 horizontal scanning lines (horizontal scanning frequency is 33.75 kHz). Meanwhile, the switch S is turned off or opened when monitoring a video signal of a so-called double-speed NTSC system having 1040 horizontal scan lines (known as non-interlaced video signal of double horizontal scanning frequency 31.5 kHz), thereby setting the reference voltage of the operational amplifier OP to a higher level.

Figure 2A:
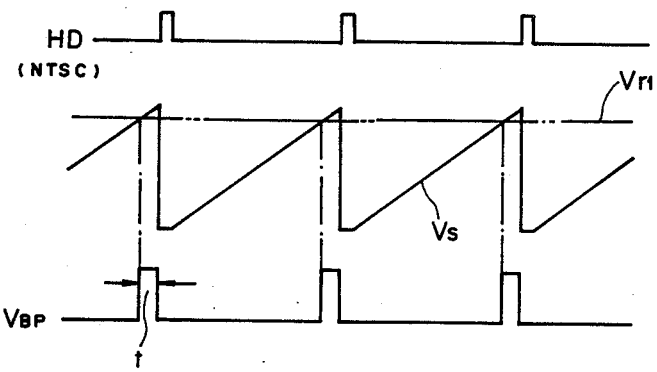
FIGS. 2(a) and 2(b) show waveforms of signals present in the operation of the circuit of FIG. 1.

Because the blanking circuit of the present invention is constructed as above, when a video signal of the double-speed scanning NTSC system shown in FIG. 2(a) is to be viewed on a monitor television receiver, a horizontal synchronizing signal HD having a repetition frequency of 31.5 kHz is input to the synchronizing signal input terminal T1, and the transistor T is turned ON by signal DH, thereby generating a sawtooth signal $V_S$ at one end of the capacitor C. Meanwhile, when monitoring the video signal of the double-speed scanning NTSC system, the switch S is turned OFF so that the higher reference voltage Vr1 is supplied to one input terminal of the operational amplifier OP.

As a result, a blanking pulse $V_{BP}$ having a duration t is obtained from the output terminal T2 of the operational amplifier OP and is applied to interrupt the electron beam in the CRT, whereby proper blanking is achieved.

Figure 2B:
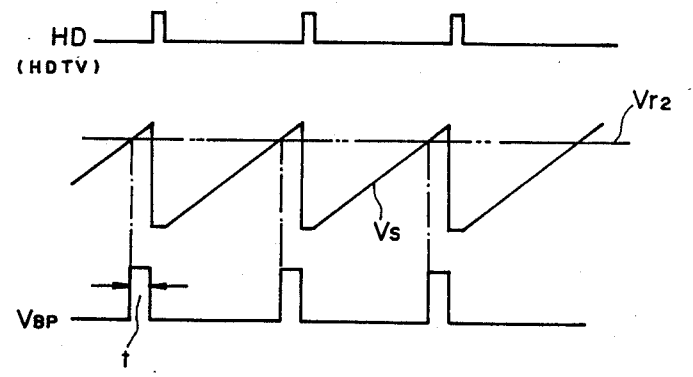

In monitoring a HDTV video signal having a horizontal scanning frequency 33.75 kHz higher than that of the double-speed scanning NTSC video signal, the sawtooth signal $V_S$ is reset by the horizontal synchronizing signal HD, as shown in FIG. 2(b). In this case, the switch S is so controlled as to be turned ON, the reference voltage is switched over to a lower level denoted by Vr2, and the sawtooth signal $V_S$ is clipped at a level to eventually produce a blanking pulse $V_{BP}$ having the same duration t as that of the double-speed scanning NTSC video signal.

The variable resistor RV is provided for executing fine adjustment to obtain exact blanking pulses with respect to the different horizontal scanning frequencies.

If a small value resistor F is inserted in the reset circuit as indicated by the dotted line, it becomes possible to shift the trailing edge of the blanking pulse $V_{BP}$ toward the synchronizing signal.

Figure 3:
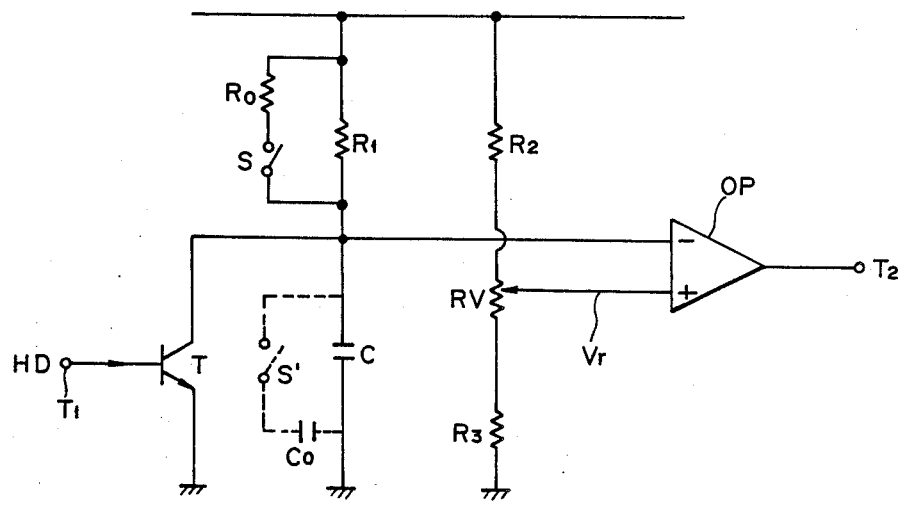
FIG. 3 is a circuit diagram of a blanking circuit according to another embodiment of the present invention.

FIG. 3 shows a second preferred embodiment of the blanking circuit of the present invention, wherein the time constant relative to generation of a sawtooth signal $V_s$ is selectively changeable in conformity with the switch-over required for monitoring an HDTV signal or a double-speed scanning NTSC signal.

Figure 4:
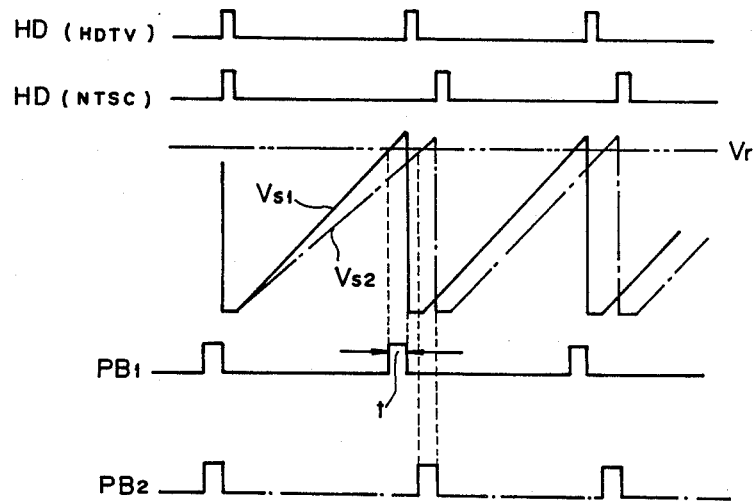
FIG. 4 shows waveforms of signals present in the operation of the circuit of FIG. 3.
Figure 5:
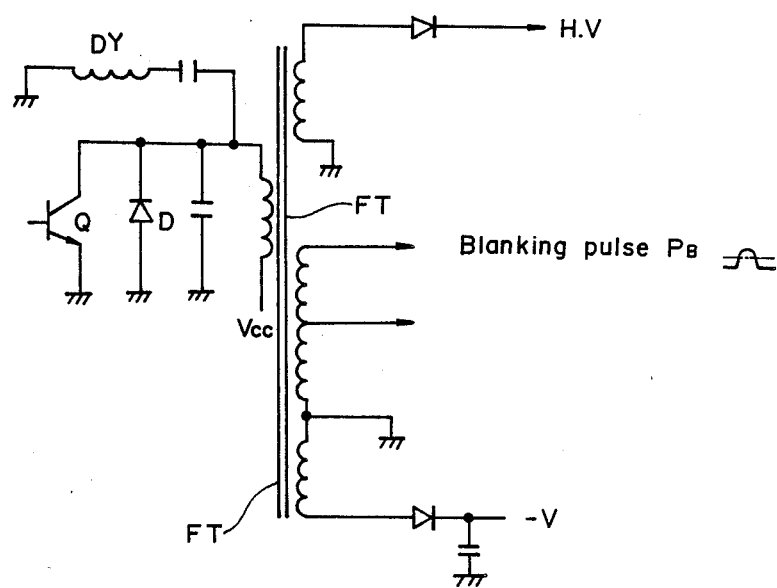
FIG. 5 is a circuit diagram of a conventional blanking pulse generating circuit.

In this embodiment, the reference voltage Vr of the operational amplifier OP is retained at a fixed value and, when monitoring the HDTV video signal of a higher horizontal scanning frequency, the switch S is controlled to connect a resistor R0 in parallel with the resistor R1, whereby the sawtooth signal $V_{S1}$ generated across the capacitor C is caused to rise with a smaller time constant, as represented by the solid line in FIG. 4, and then is sliced at the reference voltage Vr to form the desired blanking pulse PB1.

Meanwhile, when monitoring the double-speed NTSC video signal having a lower horizontal scanning frequency, the switch S is turned OFF to increase the time constant, thereby producing a sawtooth signal $V_{S2}$, as represented by a one-dot chain line.

As such sawtooth signal is sliced at the reference voltage Vr, a proper blanking pulse PB2 for the double-speed NTSC video signal is obtained from the output terminal T2 of the operational amplifier OP.

The second embodiment of FIG. 3 is constituted in such a manner that the switch S for changing the time constant is controlled to connect the resistor R0 in parallel with the resistor R1. Nevertheless, the circuit construction may be modified so that a switch S', as represented by a dotted line, is provided and actuated to connect a capacitor C0 of small capacitance in parallel with the capacitor C.

The embodiments described above are concerned with the blanking circuit adapted for use in a television receiver designed to selectively monitor HDTV or double-speed NTSC video signals, however, it is a matter of course that the blanking circuit of the present invention is applicable also to a television receiver of another type for switching and monitoring the NTSC or PAL video signal.

As described hereinabove, according to the blanking circuit of the present invention for use in a television receiver, a sawtooth signal reset by a horizontal synchronizing signal is compared with a reference voltage and a proper blanking pulse is formed in conformity with the output of such comparison, so that even if the television receiver is designed for switching the horizontal scanning frequency of the monitor video signal, the threshold level of the reference voltage or the time constant of the sawtooth generator can be selectively changed to attain accurate blanking at the proper position with facility.

It should be understood that the above description is presented by way of example only and that many modifications and variations could be effected by one with skill in the art without departing from the spirit or scope of the novel concepts of the invention, which should be determined only by the appended claims.

What is claimed is:

1. A blanking circuit for use in a video signal processing circuit of a television receiver for receiving signals according to at least two different broadcast systems having known different numbers of scan lines, respectively comprising:

means for generating a sawtooth waveform signal by resetting a ramp signal periodically with pulses at a horizontal scanning frequency;

means for generating a reference voltage;

means for comparing said sawtooth signal with said reference voltage;

means for selectively changing the relative level of said reference voltage and said sawtooth signal in response to the number of scan lines of the broadcasting system of the received video signal; and means for supplying the output of said comparing means as a blanking pulse to the video signal processing circuit.

2. A blanking circuit according to claim 1, wherein said means for selectively changing controls said means for generating a reference voltage, so as to selectively change the reference voltage in response to the broadcast system being received.

3. A blanking circuit according to claim 1, wherein said means for generating a sawtooth waveform signal comprises a constant current source, a capacitor connected in series thereto, and a switching transistor connected in parallel with said capacitor and driven by said pulses at the horizontal scanning frequency.

4. A blanking circuit according to claim 3, wherein the current value of said constant current source is selectively changed by said means for selectively changing.

5. A blanking circuit according to claim 3, wherein the effective value of said capacitor is selectively changed by said means for selectively changing.

6. A blanking circuit according to claim 1, wherein said at least two different broadcast systems include a high definition television (HDTV) system and a double-speed scanning NTSC system.

7. A blanking circuit in a video signal processing circuit of a television receiver that receives video signals of different broadcasting systems, comprising:
   (a) means for generating a sawtooth signal by resetting a ramp signal periodically with pulses of a horizontal scanning frequency;
   (b) means for generating a reference voltage;
   (c) means for comparing said sawtooth signal with said reference voltage;
   (d) switching means for selectively changing the relative level of said reference voltage and said sawtooth signal in conformity with the broadcasting system of the received video signal; and
   (e) means for supplying the output of said comparing means as a blanking pulse to the video signal processing circuit.

8. A blanking circuit according to claim 7, wherein said switching means controls said means for generating a reference voltage so as to selectively change the reference voltage in conformity with the broadcasting system being received.

9. A blanking circuit according to claim 7, wherein said means for generating a sawtooth signal comprises a constant current source, a capacitor connected in series thereto, and a switching transistor connected in parallel to said capacitor and driven by the pulses of the horizontal scanning frequency.

10. A blanking circuit according to claim 9, wherein the current value of said constant current source is selectively changed by said switching means.

11. A blanking circuit according to claim 9, wherein the value of said capacitor is selectively changed by said switching means.

12. A blanking circuit according to claim 7, wherein said different broadcasting systems of the video signal include a high definition television (HDTV) system and a double-speed scanning NTSC system.

* * * * *